Dec. 15, 1925.
R. C. FRAZA
1,565,726
LOADING AND UNLOADING DEVICE
Filed Jan. 26, 1925     3 Sheets-Sheet 1
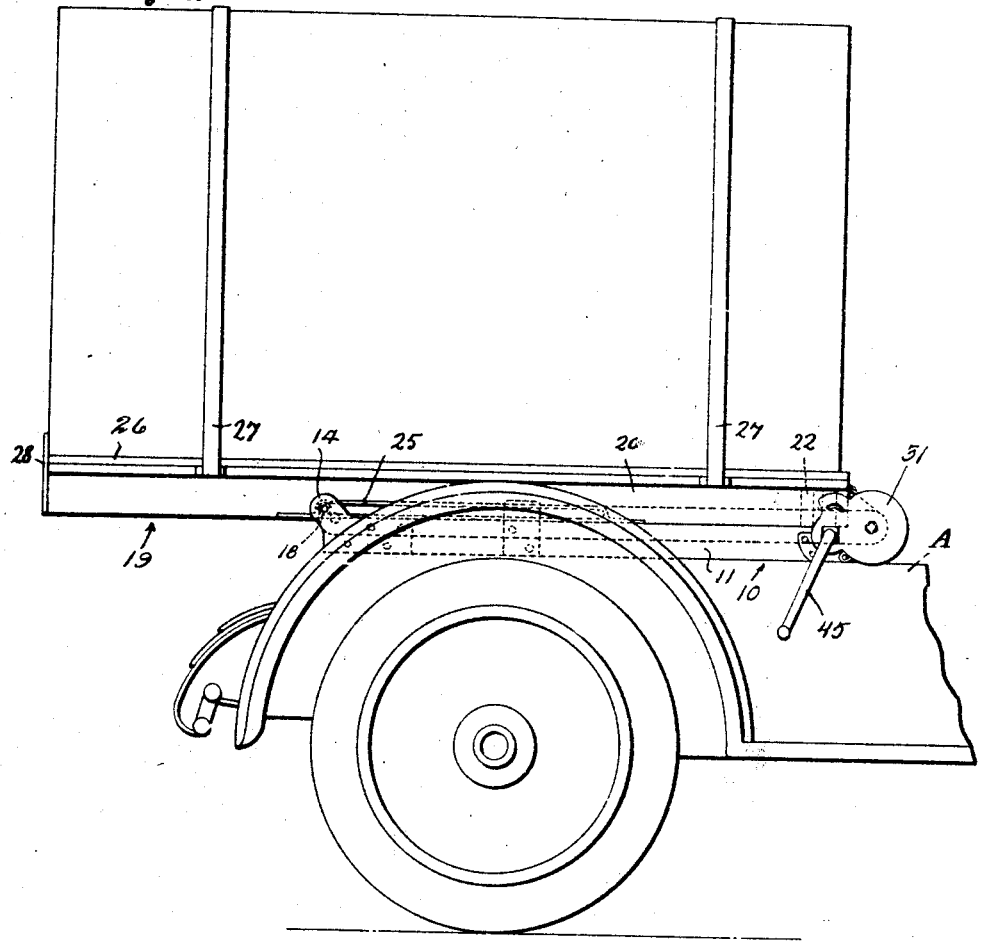
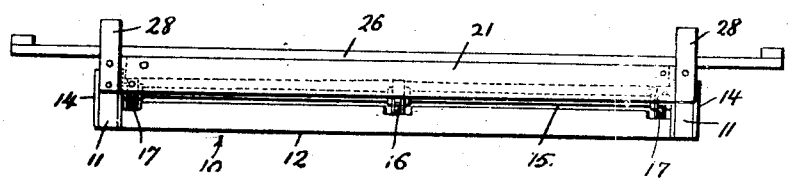
Inventor
R. C. Fraza

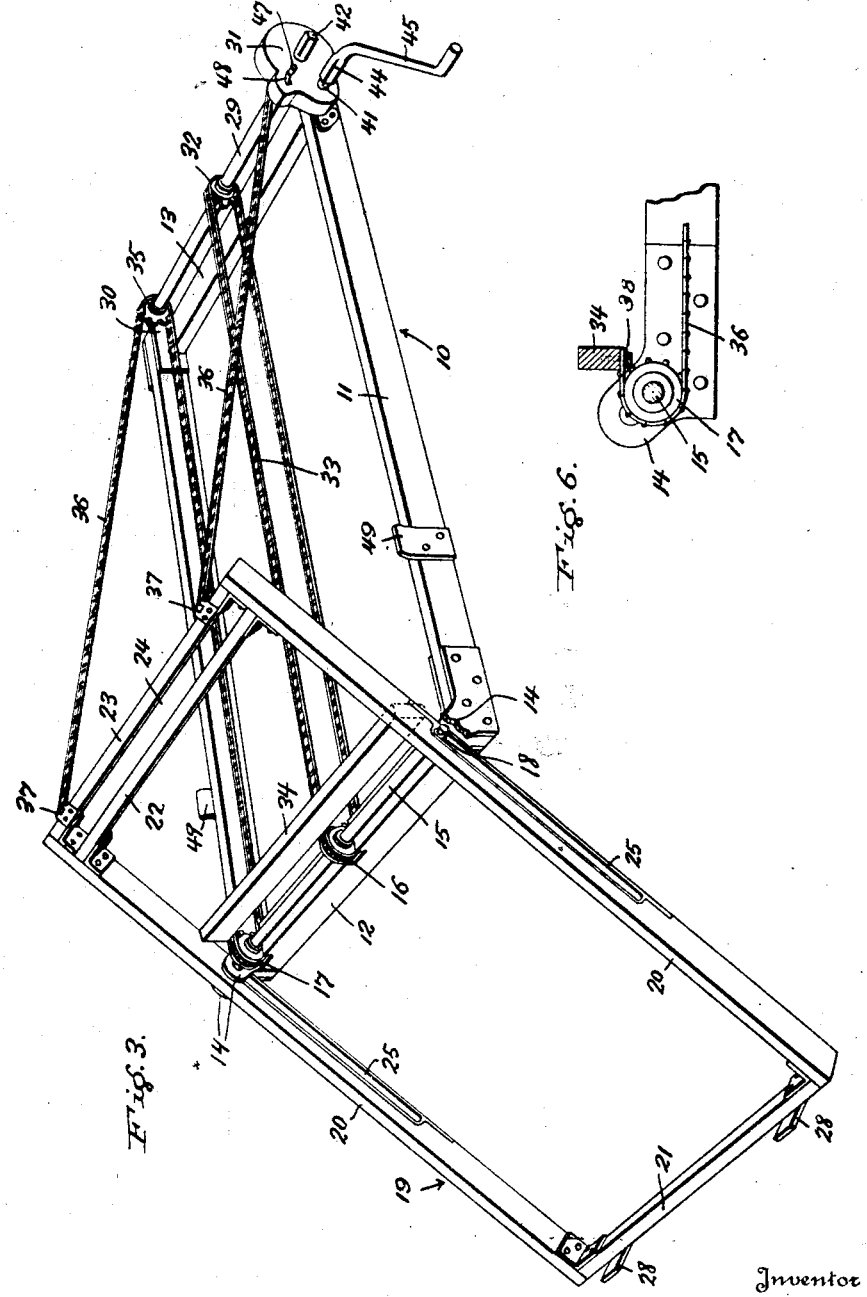

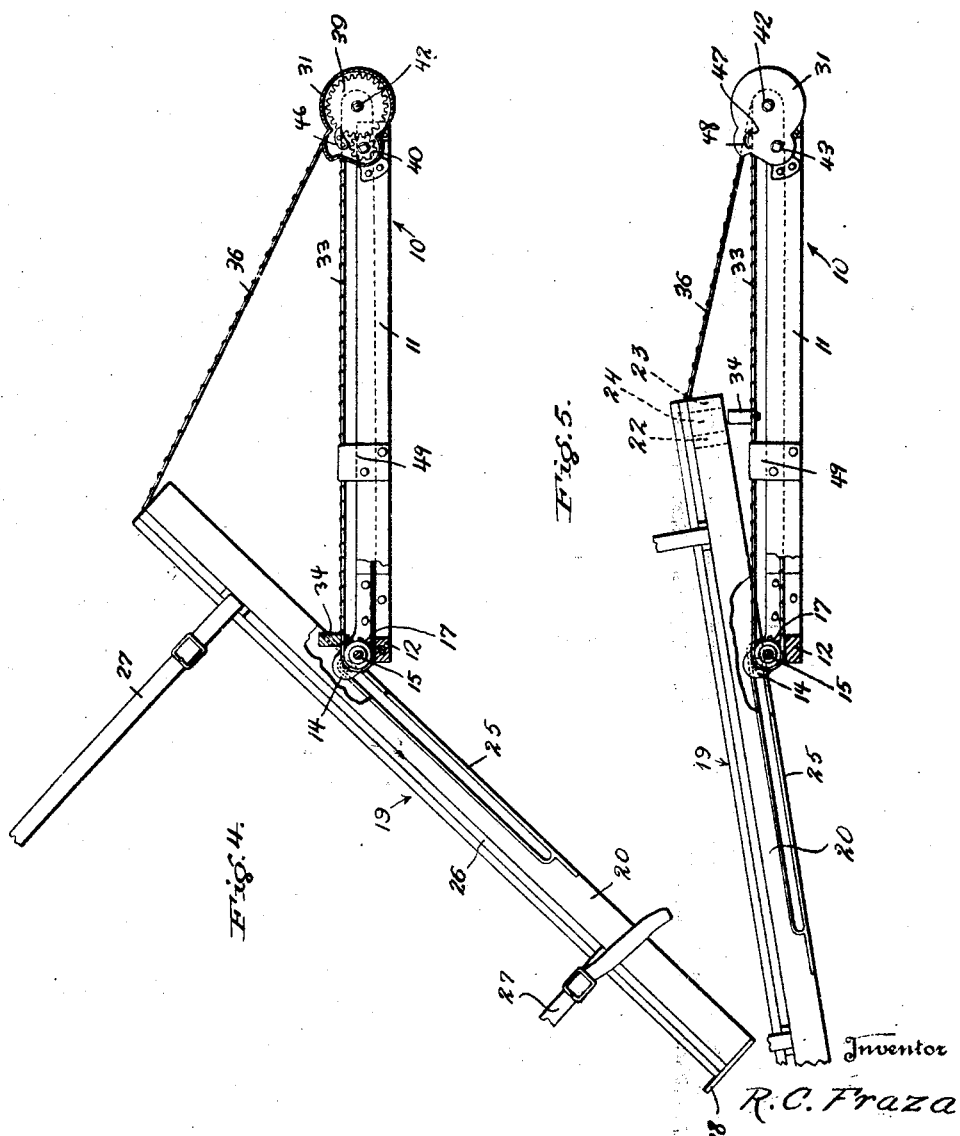

Patented Dec. 15, 1925.

1,565,726

UNITED STATES PATENT OFFICE.

ROBERT C. FRAZA, OF DIXON, ILLINOIS.

LOADING AND UNLOADING DEVICE.

Application filed January 26, 1925. Serial No. 4,853.

*To all whom it may concern:*

Be it known that I, ROBERT C. FRAZA, a citizen of the United States, residing at Dixon, in the county of Lee and State of Illinois, have invented certain new and useful Improvements in Loading and Unloading Devices, of which the following is a specification.

This invention relates to vehicle attachments, particularly to a movably mounted platform or body for effecting loading and unloading of articles or material and has for its object the provision of a novel platform or body mounting so constructed and arranged as to have slidable and pivotal movement with respect to the frame or chassis of a motor or other vehicle to which it is applied.

An important object is the provision of a device of this character designed to be used primarily for loading and unloading pianos or other heavy and bulky objects, in case of platform construction, and also capable of handling materials for effecting dumping thereof, in the event of a box-like body construction.

In designing a loading and unloading or dumping platform or body for use in connection with motor vehicles of many kinds, it frequently occurs that the height of the vehicle frame above the ground is so great that a mere pivotal movement of the auxiliary or movable frame carrying the platform or body is not practical. It is with this fact in view that I have designed the present structure in which the movable frame is mounted for slidable as well as pivotal movement in order that when unloading or dumping is desired the movable frame will be slid outwardly beyond the vehicle frame prior to the tilting movement which will result in depositing of the object or dumping of the material upon the ground.

A more specific object is to provide a structure of this character in which a windlass mechanism is provided for effecting movement of the auxiliary or movable frame carrying the platform or body, the windlass further operating to move a carrier with which the movable frame engages whereby the tilting and sliding movement will be controlled by a single operating member, the windlass structure preferably including reduction gearing whereby powerful leverage will be exerted for easily moving a heavy load.

The invention further contemplates the provision of various details in the matter of connecting means, guide means and the like, which will constitute a distinct improvement in the art in point of cheapness in manufacture, ease in operation, efficiency in action, and durability in service.

With the above and other objects and advantages in view, the invention consists in the details of construction to be hereinafter more fully described and claimed, and illustrated in the accompanying drawings in which:

Figure 1 is a side elevation of a portion of a motor vehicle equipped with my invention, Figure 2 is a rear elevation, Figure 3 is a perspective view of the complete device detached from the vehicle chassis, the movable frame being shown in its dumping or unloading position, Figure 4 is a longitudinal section showing the device in dumping or unloading position, Figure 5 is a similar view showing the movable frame as swung nearly into horizontal position during the act of loading or at the latter part of the act of unloading.

Figure 6 is a fragmentary, longitudinal section showing the arrangement of parts at the rear of the chassis frame.

Referring more particularly to the drawings the letter A designates a portion of a motor vehicle having the usual chassis. This vehicle may be a truck, roadster, coupé or the like of any desired carrying capacity though it should be distinctly understood that if desired the device may be just as easily used upon a wagon, sleigh or the like, there being no limitation in this respect.

In carrying out the invention I provide a stationary or main frame designated broadly by the numeral 10 and including longitudinal or side bars 11 connected at intervals by cross bars 12 and 13. This frame may be of wooden or metallic construction and of a size proper to fit upon the running gear of a wagon or the like or upon the chassis or frame of whatever motor vehicle is to be equipped. At the rear ends of the longitudinal or side bars 11 are suitable brackets 14 through which is journaled a horizontal shaft 15 carrying sprockets 16 and 17. The brackets 14 are arranged in pairs as shown and journaled on the shaft. Between the pairs of brackets are rollers 18 for a purpose to be described.

The device further includes a movable frame 19 including any desired number of longitudinal bars 20 and cross bars 21, 22 and 23, all of which may be suitably reinforced at their junctures and constructed of any preferred material. The bars 22 and 23 are spaced apart to define a pocket 24 for a purpose to be described. The side bars 20 are formed or otherwise provided with longitudinal elongated slotted guides 25 within which the above described rollers 18 are located, this arrangement providing a mounting whereby the movable frame 19 may slide and also tilt with respect to the relatively stationary frame 10.

The movable frame 19 may carry any preferred type of box-like body, in case the device is intended for handling building or other material, or it may carry a platform 26 in case the device is provided for the purpose of handling pianos or other heavy and bulky objects. Suitable securing straps or the like 27 may be provided for holding a piano or other similar article on the platform and the end may be provided with upstanding stops 28 for the purpose of preventing the object from sliding off from the platform during sliding and tilting movement thereof, it being obvious that after the movable frame has been moved rearwardly and permitted to tilt to unloading position the straps 27 may be unfastened and the lower end of the object lifted over and out of engagement with the stops 28 to effect its removal from the platform.

The operating means includes a shaft 29 journally mounted at the forward end of the stationary frame 10 in a bearing 30 and a housing 31. On the intermediate portion of this shaft is a sprocket 32 about which is trained a chain 33 peripherally engaged with the sprocket 16 on the shaft 15. Suitably secured upon the chain 33 is a transverse bar 34 of a size to be received within the pocket 24. Carried by the shaft 29 are other sprockets 35 about which are trained chains or the like 36 connected at one end with the forward cross bar 23 of the movable frame 19, as shown at 37, and connected at their other ends with the cross bar 34 as shown at 38. These chains 36 are peripherally engaged with the sprockets 17.

Secured on the shaft 29 within the housing 31 is a gear 39 with which meshes a pinion 40 on a short shaft 41 journaled through the housing. The shafts 29 and 41 have squared extensions 42 and 43 respectively upon either of which may be engaged the socketed end 44 of a crank handle 45. Pivoted within the housing is a pawl 46 normally engaging the gear 39 for preventing retrograde movement thereof during rotation of the shaft 29 to effect loading. When it is desired to unload whatever material or object is being carried this pawl must be swung out of engagement with the gear 39 and for this reason it is provided with a pin 47 which projects beyond the outside of the housing through a slot 48 therein. The slot acts to limit the swinging movement of the pawl. For holding the movable frame 19 in registration with the stationary frame 10 during travel of the vehicle and for guiding the movable frame to its proper position upon the stationary frame, use may be made of upstanding guide plates or members 49 mounted on the bars 11 and projecting thereabove so as to engage against the outer sides of the bars 20.

Assuming that the movable frame is in its normal position, as shown in Figure 1, whenever it is desired to effect unloading, it is first necessary to swing the pawl 46 out of engagement with the gear 39. The crank handle may be applied to either the squared extension 42 or the extension 41 as preferred, depending upon the weight of the load and the strength of the operator, and the crank handle is then turned to rotate the shaft 29 toward the rear of the vehicle whereupon the rearward movement of the upper stretch of the chain 33 will cause the cross bar 34 to travel rearwardly. As this bar is engaged within the pocket 24, it is obvious that the movable frame 19 will be carried rearwardly to a point past the center of gravity, the guides 25 traveling upon the rollers 18. As soon as the movable frame is moved to a point past its center of gravity, the chains 36 will become taut and will check tendency of the movable frame to slide downwardly and rearwardly. As the operator continues to rotate the shaft 29, the upper stretches of the chains 36 are paid out, permitting the movable frame to slide further rearwardly until the rollers 18 are engaged by the forward ends of the guides 25. Continued rotation of the shaft 29 permits the movable frame to pivot until it reaches the lowermost or unloading position illustrated in Figures 3 and 4.

Assuming that the movable frame is in dumping position and it is desired to return it to normal position, it is first necessary to swing the pawl 46 into engagement with the gear 39. The crank handle may be applied to either the shaft 41 of the shaft 29 and it is turned to rotate the shaft 29 toward the front of the vehicle. When this is done driving strain is applied to the chains 36 and they will operate first to swing the forward end of the movable frame downwardly and then to slide or drag the movable frame forwardly until the pocket 24 engages with the cross bar 34, after which the forward movement of the upper stretch of the chain 33 carrying the cross bar 34 will operate to draw the movable frame to its forwardmost position resting flat upon the stationary frame 10.

From the foregoing description and a study of the drawings it will be apparent that I have thus provided a simply constructed, inexpensive and easily operated device for the purpose specified which will be efficient in its operation and consequently a time and labor saver in handling heavy materials or articles. As the parts are few it is evident that there is little to get out of order so that the device should have a long and satisfactory life.

While I have shown and described the preferred embodiment of the invention, it should be understood that the disclosure is for illustrative purposes only inasmuch as various changes and variations may be made in the details of construction and arrangement of parts to widen the field of utility and increase the adaptability of the device, provided such modifications constitute no departure from the salient features of the invention or the scope of the appended claims.

Having thus described the invention, I claim:

1. In a device of the character described, a relatively stationary frame adapted to be mounted upon a vehicle chassis, a shaft journally mounted at the rear end of said frame, a relatively movable frame mounted for longitudinal sliding and vertical tilting upon said stationary frame, an operating shaft journaled at the forward end of the stationary frame, drive elements on both of said shafts, a flexible member trained about said drive elements, a member carried by said flexible member, means on the movable frame normally engaging said last-named member, and means connected with said last-named member and the forward end of the movable frame and operatively driven by the second-named shaft for controlling tilting of the movable frame.

2. In a loading and unloading device, a stationary frame adapted to be mounted upon a vehicle, brackets at the rear end of the frame carrying rollers, a relatively movable frame mounted above the stationary frame and having elongated slotted guides receiving the rollers whereby the movable frame may be capable of longitudinal sliding and vertical tilting movement, shafts journaled at the forward and rear ends of the stationary frame and carrying sprockets, a chain trained about said sprockets, a carrier member mounted on said chain transversely thereof, the movable frame having a pocket normally engaging upon said carrier element, means for moving one of the shafts to drive the chain, other sprockets on said shafts, and chains peripherally engaging said last-named sprockets and connected at one end with said carrier member and connected at their other ends with the forward end of the movable frame.

In testimony whereof I affix my signature.

ROBERT C. FRAZA.